United States Patent [19]
Tsuboi et al.

[11] 3,983,465
[45] Sept. 28, 1976

[54] ELECTRIC BRAKING CONTROL APPARATUS FOR DC MOTOR

[75] Inventors: Takashi Tsuboi; Hiroshi Narita; Toru Higuchi, all of Katsuta, Japan

[73] Assignee: Hitachi, Ltd., Japan

[22] Filed: Apr. 15, 1975

[21] Appl. No.: 568,195

[30] Foreign Application Priority Data
Apr. 17, 1974 Japan.............................. 49-42128
Sept. 13, 1974 Japan............................ 49-105070

[52] U.S. Cl................................. 318/376; 318/380
[51] Int. Cl.² ............................................ H02P 3/14
[58] Field of Search ......................... 318/364–367, 318/375, 376, 379–381

[56] References Cited
UNITED STATES PATENTS
3,577,055  5/1971  Hermansson .................. 318/380 X
3,848,169  11/1974  Asano et al. ..................... 318/376
3,930,191  12/1975  Loderer .......................... 318/376

Primary Examiner—Robert K. Schaefer
Assistant Examiner—W. E. Duncanson, Jr.
Attorney, Agent, or Firm—Craig & Antonelli

[57] ABSTRACT

An electric braking control apparatus for the DC motor comprises; a DC power supply; a series circuit including the field winding and armature of a DC motor a smoothing reactor and a resistor connected to the DC power supply; a chopper connected in parallel to the series circuit, and a diode inserted between the DC power supply and the parallel circuit including the series circuit and the chopper. The field winding and the resistor are regulated in effecting regenerative braking of the DC motor by turning on and off the chopper.

16 Claims, 30 Drawing Figures

ELECTRIC BRAKING CONTROL APPARATUS FOR DC MOTOR

The present invention relates to an electric braking control apparatus for the DC motor or more in particular to a regenerative braking control apparatus for the DC motor using a thyristor chopper.

In recent years, the apparatus for the powering control and regenerative braking control of the DC motor for driving the DC electric car by the use of a thyristor chopper has been in practical use. In such an apparatus, a chopper is connected in series with the DC motor and turned on and off at the time of powering the electric car. The duty cycle of the chopper is changed thereby to regulate the motor voltage continuously from zero to the line voltage, so that the acceleration substantially up to the rated velocity is accomplished.

In effecting the regenerative braking, on the other hand, the DC motor is connected in parallel to the chopper, which is turned on and off. The voltage generated in the motor functioning as a self-exciting generator is thus boosted and the regenerative cirrent is turned back to the stringing.

For the stable regenerative braking control by the chopper, it is vital that the motor current be reduced without fail at the time of turning off the chopper, which in turn makes it essential that the voltage generated in the motor (hereinafter referred to as the motor voltage) be always lower than the line voltage. Generally, the motor is such that when the motor current is controlled at the rated current value, the voltage generated therein is substantially equal to the line voltage at the rated velocity. Therefore, it is impossible to attain any satisfactory braking power if the regenerative braking is tried at higher than the rated velocity. In spite of this, it has been mentioned that it is common practice to run the electric car at higher than the rated velocity by the field control of the motor. This makes necessary an effective regenerative braking from a higher velocity than the rated velocity.

In order to attain a satisfactory braking power at a higher than the rated velocity, a method has been suggested in which a resistor is connected in series with the motor at velocities higher than the rated velocity. In other words, the braking operation with the rated current is made possible at higher than the rated velocity by rendering the voltage drop across the resistor take charge of the difference between the motor voltage and the average voltage across the chopper.

In spite of the fact that the higher the value of the resistor inserted is, the higher voltage drop across the resistor contributes to the regenerative braking at a higher velocity above the rated speed, and it is also true that more electric power of all the power generated in the motor is consumed by the resistor. The increased consumption of power by the resistor results in the disadvantage of a lower regenerating efficiency as well as the disadvantage that the higher the velocity at which the regenerative braking is effected, the larger capacity of the resistor is required.

The present invention has been made to obviate the above-mentioned disadvantages and an object thereof is to provide an electric braking control apparatus for the DC motor which is high in regenerating efficiency on the one hand and in which a satisfactory braking power is obtained on the other hand also at motor velocities higher than the rated velocity even if the resistor connected in series with the motor at the time of regenerative braking is small in capacity.

According to the present invention, there is provided: in an electric braking control apparatus for the DC motor comprising a DC power supply; a series circuit including a smoothing reactor connected in series with the DC power supply, a DC motor with the armature and field winding thereof connected in series with each other, and a resistor; a chopper connected in parallel to the series circuit; and a diode inserted between the DC power supply and the parallel circuit including the series circuit and the chopper; the chopper being turned on and off for effecting the regenerative braking: the improvement further comprising field regulating means for regulating the field of the field winding and resistance regulating means for regulating the resistance value of the resistor, the regenerative braking being effected by combined use of the field regulating means and the resistance regulating means.

The above and other objects, features and advantages will be made apparent by the detailed description taken in conjunction with the accompanying drawings, in which.

Figure 1:
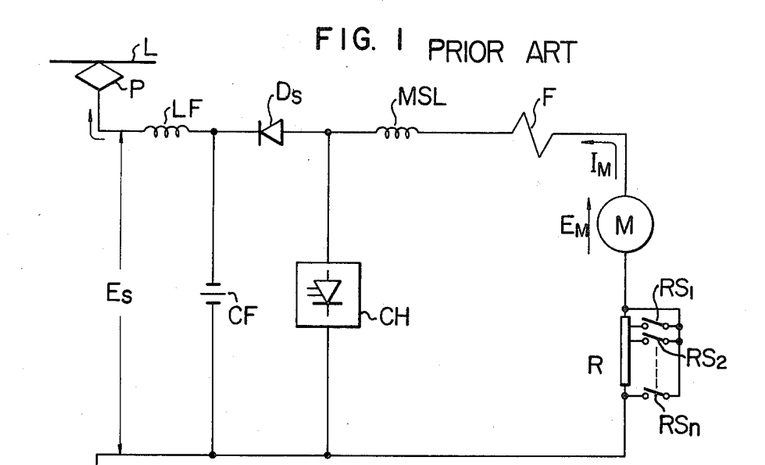
FIG. 1 is a diagram showing the construction of the main circuits of a conventional apparatus.

Referring to FIG. 1, reference symbol L shows the stringing, symbol PG a pantagraph, symbol M the armature of a DC motor, symbol F the series field wing of the DC motor, symbol MSL a smoothing reactor and symbol R a resistor. The armature M, the series field winding F, the smoothing reactor MSL and the resistor R are connected in series with each other. Symbol CH shows a chopper, and symbole Ds a diode for preventing the reverse flow of motor current from the stringing L to the earth when the chopper is turned on and also for turning back the motor current to the stringing L when the chopper is turned off. Symbols $RS_1$, $RS_2$ ... $RS_n$ show switches for short-circuiting the resistor R, symbol LF a reactor, and symbol GF a capacitor. The reactor LF and the capacitor CF constitute a filter.

In effecting the regenerative braking control by the apparatus with the construction shown in FIG. 1, the chopper CH is first turned on, and then the series circuit including the DC motor, the smoothing reactor MSL and the resistor R is short-circuited. Energy is stored increasingly in the smoothing reactor MSL by the motor current $I_M$. When the chopper CH is turned off at an appropriate time thereafter, the function of the smoothing reactor MSL causes the motor current $I_M$ to be turned back to the stringing L in the form of the regenerative current $I_S$. At this time, the motor current $I_M$ is decreased by the time constant as related to the motor voltage $E_M$ and the line voltage $E_S$.

Figures 2, 3:
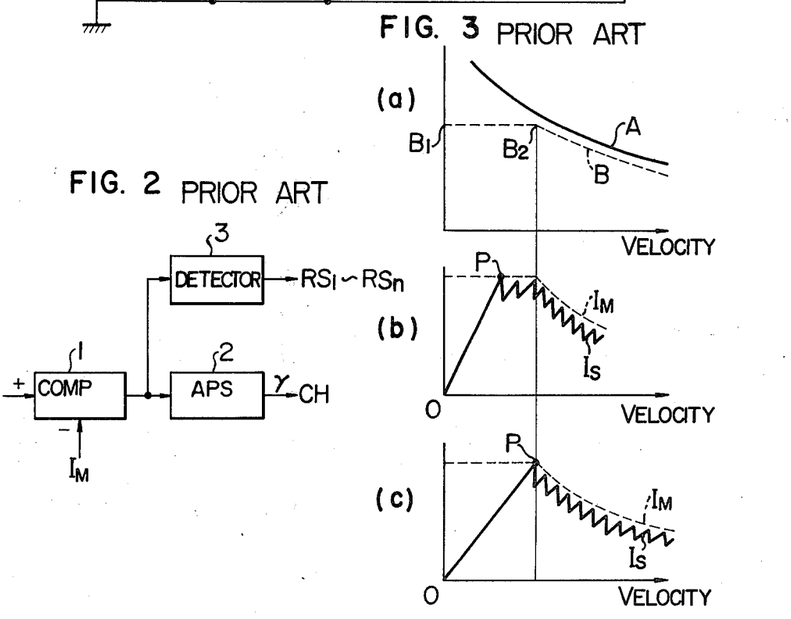
FIG. 2 is a block diagram showing the outline of the conventional apparatus.
FIG. 3 is a diagram showing the operating characteristics of the conventional apparatus.

The manner in which the resistance of the resistor R is regulated will be explained below with reference to FIG. 2 showing a block diagram of the control apparatus of FIG. 1.

Reference numeral 1 shows a comparator for comparing the current command value $I_P$ of the motor with the actual motor current $I_M$, numeral 2 a phase shifter for determining the duty cycle $\gamma$ of the chopper CH in response to the output of the comparator 1, and numeral 3 a detector circuit for detecting the duty cycle of the chopper CH in response to the output from the comparator 1.

At the time of starting the regenerative braking, all the switches $RS_1$ to $RS_n$ are open and therefore the resistance value of the resistor R is nothing other than R itself. The comparator 1 compares the current command value $I_P$ with the motor current $I_M$, and according to the output representing the difference therebetween, the phase shifter 2 regulates the duty cycle $\gamma$ of the chopper CH. Specifically, in the event that the motor current $I_M$ is small as compared with the current command value $I_P$, the duty cycle $\gamma$ is increased, that is to say, the period of energization of the chopper CH is lengthened thereby to increase the motor current $I_M$.

Thus, even though reduction in the motor voltage $E_M$ with the deceleration of the motor causes the motor current $I_M$ to be decreased, it is possible, by increasing the duty cycle $\gamma$, to accomplish the braking operation while maintaining the motor current $I_M$ constant.

When the duty cycle $\gamma$ reaches its maximum subsequently, the detector circuit 3 decides that the energization period of the chopper CH cannot be lengthened any more. The detection by the detector circuit 3 of the fact that the duty cycle $\gamma$ has thus reached its maximum causes the switch $RS_1$ to be closed thereby to reduce the resistance value of the resistor R.

With the decrease in the resistance value of the resistor R, the motor current $I_M$ tends to be increased. Therefore, the duty cycle $\gamma$ is decreased again in such a manner that the motor current $I_M$ becomes equal to the command value $I_P$.

Subsequently, similar processes of operation are repeated by reducing the resistance value of the resistor R by sequentially closing the switches $RS_2$ to $RS_n$ to perform the regenerative braking operation.

In the regenerative braking operation performed as mentioned above, the fact that the braking at velocities higher than the rated velocity is made possible by inserting the resistor R in series with the DC motor unlike the case involving the mere on-off operation of the chopper CH will be explained below with reference to formulae.

Referring again to FIG. 1, let the average voltage across the chopper CH be $E_{CH}$, the voltage generated by the motor acting as a generator, namely, the motor voltage $E_M$, the motor current $I_M$, and the circuit resistance including the internal resistance of the motor R. The equation below is obtained.

$$E_M = E_{CH} + RI_M \qquad 1.$$

The chopper voltage is expressed as $$E_{CH} = E_s (1 - \gamma) \qquad 2.$$

where $E_S$ is the electric car line voltage and $\gamma$ the duty cycle of the chopper CH.

Therefore, the chopper voltage $E_{CH}$ can be continuously changed in the range $O < E_{CH} < E_S$ by adjusting the duty cycle $\gamma$ of the chopper CH in the range $0 < \gamma < 1$.

Incidentally, as will be seen from the equation (2) above, even with an ideal chopper capable of continuously changing the duty cycle $\gamma$ from 0 to 1, it is only up to the car line voltage $E_S$ that the chopper voltage $E_{CH}$ can be raised.

The motor voltage $E_M$, on the other hand, is given by the equation $$E_M = \phi (I_F) V \qquad 3.$$

where $I_F$ is the field current, $\phi$ the field magnetic flux and V the velocity of the electric car.

It is well known that the braking power is expressed as $$BE = \phi (I_F) I_M \qquad 4.$$

As a result, the velocity V is obtained as expressed by the equation below, $I_F$ being equal to $I_M$.

$$V = \frac{E_s(1 - \gamma) + RI_M}{\phi (I_M)} \qquad 5.$$

In equation (5) above, in order to increase the velocity V, the duty cycle $\gamma$ should be decreased. In view of the fact that the minimum value of the duty cycle $\gamma$ is zero as in the case of an ideal chopper, the velocity at which the regenerative braking is possible is lower than the rated velocity if the armature current $I_M$ is the same as the rated current. Consequently, the armature current $I_M$ is less than the rated current and the braking power lower at velocities higher than the rated velocity.

When the resistor R is inserted, on the other hand, the motor voltage $E_M$ is expressed by the equation below.

$$E_M = E_{CH} + (R_0 + R_B) I_M \qquad 6.$$

where $R_B$ is the resistance value of the resistor R, and $R_0$ the internal resistance of the motor circuit.

By causing the voltage drop across the resistor R to take charge of the difference $E_M - E_{CH}$, the braking is made possible at rated current even when a velocity higher than the rated velocity is involved.

It will be noted from the foregoing description that the insertion of the resistor R permits a braking force to be obtained whereby the braking is possible at a sufficiently high velocity as compared with the rated velocity.

The greater the value of the resistor R, the greater the voltage drop across the resistor R, resulting in a correspondingly higher maximum velocity at which the regenerative braking is possible. However, this accompanies the disadvantage of a greater electric power consumed by the resistor R of all the power supply $E_M I_M$ generated by the motor, thus deteriorating the regenerating efficiency. Another disadvantage is that the resistor R of a larger capacity is required according to the velocity maximum for regenerative braking. This fact will be explained with reference to FIG. 3.

The braking of an electric car takes advantage of the frictional force between the wheels and the rails to obtain the braking force. The frictional force has a certain limitation which is called a limit of adhesion. The limit of adhesion, which is determined by the coefficient of friction $\mu$ and the axle weight W, decreases with the increase in velocity as shown in (a) of FIG. 3. If the braking force is applied above the limit of adhesion, the wheels slide and no effective braking is attained. Therefore, it is necessary to decrease the braking force progressively with the velocity. In other words, the braking force B must be reduced as shown by the dotted line in (a) of FIG. 3. In this graph showing the braking force characteristic, the range from $B_1$ to $B_2$ is determined by the relation between the braking distance and the riding comfort. The range beyond $B_2$ is one in which the limit of adhesion takes part in reducing the braking force.

The braking characteristic of an electric car with a comparatively low velocity is shown in (b) of FIG. 3, in which case the range influenced by the limit of adhesion is comparatively narrow. The motor current $I_M$ is controlled according to the braking characteristic as shown by the dotted line in (b) of FIG. 3. In this case, the regenerative current $I_S$ is as shown by the solid line. The reason why the regenerative current $I_S$ changes in steps is that the parts of the resistor R are short-circuited in sequence. In the range 0 to P in (b) of FIG. 3, the motor voltage $E_M$ is lower than the line voltage $E_S$ and the resistor R is completely short-circuited, so that the controlling operation is performed only by the regulation of the chopper CH. In the velocity range higher than point P, on the other hand, the resistor R is inserted and the motor current is regulated in accordance with the limit of adhesion by controlling both the operation of the switches $RS_1$ to $RS_n$ and the duty cycle of the chopper CH. Generally, the velocity at point P corresponds to the rated velocity of the motor and is commonly selected at half or one-third of the maximum velocity.

Referring to (c) of FIG. 3 showing the case of an electric car with a higher maximum velocity, point P approximates the limit of adhesion or, in some cases, even enters the range influenced by the limit of adhesion.

As will be apparent from the above explanation, the motor current $I_M$ must be reduced in the range of velocity where the braking force is influenced by the limit of adhesion. Therefore, the regenerative current $I_S$ as expressed as $$I_S = I_M (1 - \gamma) \qquad 7.$$

is reduced, so that the regenerative power $E_S I_S$ is also decreased. The decrease in the regenerative power leads to an increased amount of the electric power consumed in the resistor R of all the power $E_M I_M$ generated by the motor, with the result that the regenerating efficiency is reduced. In addition, a resistor with a larger capacity is required.

Accordingly, the present invention is characterized in that in controlling the regenerative braking of the DC motor, not only the resistance value of the resistor connected in series with the motor but the field current of the field winding of the motor are regulated, thereby permitting the regenerating efficiency to be improved on one hand and at the same time the resistor to be reduced in capacity.

An embodiment of the invention will be described below with reference to the accompanying drawings.

Figure 4:
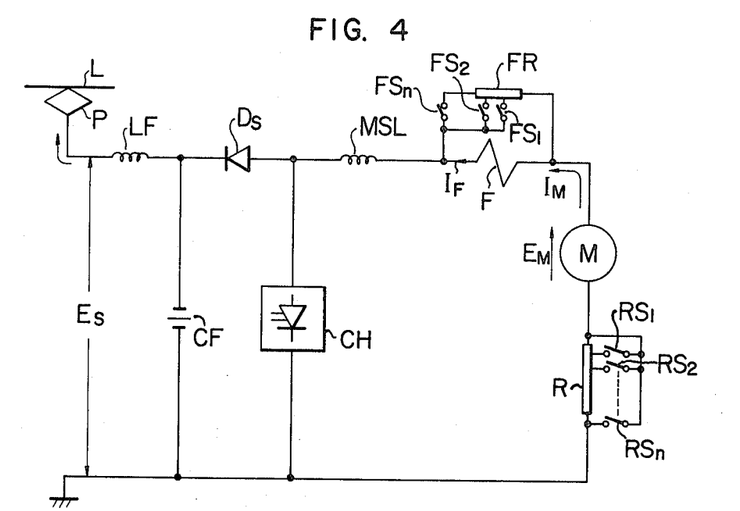
FIG. 4 is a diagram showing the configuration of the main circuits according to an embodiment of the invention.

The diagram of FIG. 4 shows the construction of the main circuits of an embodiment of the invention, which is different from the construction of FIG. 1 in that in the embodiment under consideration a bypass circuit comprising a bypass resistor FR and field switches $FS_1$ to $FS_n$ is added as a field regulating device for regulating the field current flowing in the field winding F. The other reference symbols show like component elements in FIG. 1. By providing such a bypass circuit, the motor current $I_M$ is divided into portions flowing in the field winding F and the bypass resistor FR, and therefore the field current $I_F$ flowing in the field winding F is regulated by sequentially adjusting the resistance value of the bypass resistor FR by operating the switches $FS_1$ to $FS_2$.

Figure 5A:
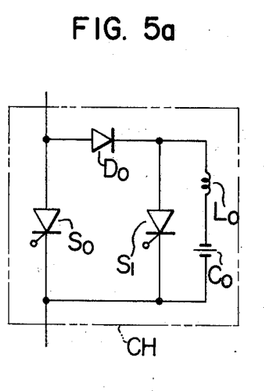
FIGS. 5a to 5c are diagrams showing details of examples of the thyristor choppers.
Figure 5B:
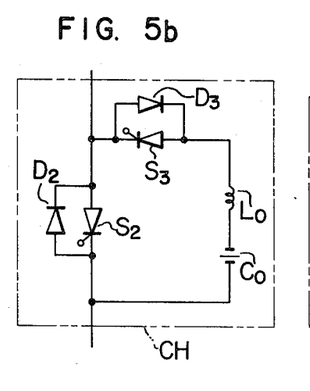
Figure 5C:
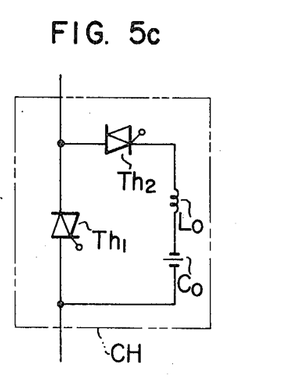

Detailed examples of the chopper of FIG. 4 which is a well known circuit is shown in FIGS. 5a to 5c. The chopper shown in FIG. 5a comprises a main thyristor $S_0$, an auxiliary thyristor $S_1$, a diode $D_0$, a commutating reactor $L_0$, and a commutating capacitor $C_0$. During the energization of the chopper CH, the main thyristor $S_0$ is on and the motor current $I_M$ flows through the main thyristor $S_0$. When the chopper is turned off, by contrast, the auxiliary thyristor $S_1$ is turned on, and a closed circuit including the thyristor $S_1$, the commutating reactor $L_0$ and the commutating capacitor $C_0$ is formed. The energy stored in the commutating capacitor $C_0$ flows as a discharge current in the closed circuit, and then flows through the thyristor $S_0$ and the diode $D_0$, so that the thyristor $S_0$ is reverse-biased into an off state.

The chopper shown in FIG. 5b comprises a main thyristor $S_2$ and an auxiliary thyristor $S_3$ connected in parallel with a diode $D_2$ and a diode $D_3$ in opposite direction respectively, and a closed circuit is comprised of the main thyristor $S_2$, the auxiliary thyristor $S_3$, the commutating reactor $L_0$ and the commutating capacitor $C_0$. During the energization of the chopper CH, the main thyristor $S_2$ is also maintained turned on, whereas when the chopper CH is turned off, the auxiliary thyristor $S_3$ is turned on and the main thyristor $S_2$ turned off.

In the chopper shown in FIG. 5c, the thyristor-diode combinations in reverse parallel connection are replaced by reverse-conducting thyristors $Th_1$ and $Th_2$ consisting of integrations of a thyristor and a diode respectively, and the operation thereof is quite the same as that of the circuit of FIG. 5b.

By the way, the chopper CH is not limited to those illustrated in FIGS. 5a to 5c.

Figure 6:
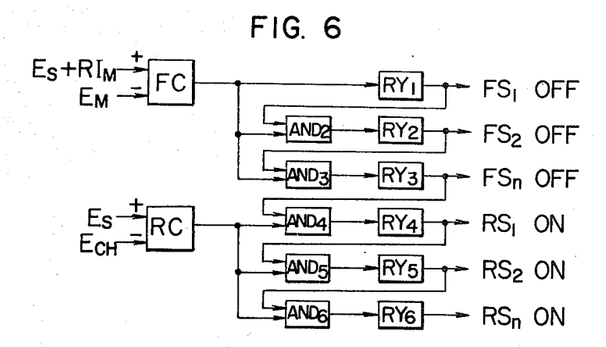
FIG. 6 is a block diagram showing the control apparatus of FIG. 4.

The circuit for controlling the operation of the switches $FS_1$ to $FS_n$ and the switches $RS_1$ to $RS_n$ is shown in FIG. 6. Reference symbol FC shows a first comparator for producing an open signal for the field switches $FS_1$ to $FS_n$ when the motor voltage $E_M$ is reduced to a certain degree below the sum of the line voltage $E_S$ and the voltage drop across the resistor R, that is, when the difference therebetween exceeds a first set value. Symbol RC shows a second voltage comparator for producing an open signal for the switches $RS_1$ to $RS_n$ when the average voltage of the chopper CH becomes smaller than the line voltage $E_S$ by a second set value, symbols $RY_1$ to $RY_6$ the operating relays for the switches $FS_1$ to $FS_n$ and $RS_1$ to $RS_n$, and symbols $AND_2$ to $AND_6$ logical elements for determining the order of operation of the switches. When each preceding switch in the sequence of $FS_1$ to $FS_n$ and $RS_1$ to $RS_n$ is in a predetermined state (on or off) and at the same time the voltage comparator FC or RC is producing an open or close signal, as the case may be, a corresponding signal is produced by the ligical elements $AND_2$ to $AND_6$.

The operation of the circuit shown in FIG. 6 will be explained below with reference to the braking characteristics diagrams of FIG. 7.

Prior to the starting of the regenerative braking, all the switches $FS_1$ to $FS_n$ are closed while the switches $RS_1$ to $RS_n$ are all open. Assuming that the braking operation is started at a maximum velocity slightly higher than the velocity $V_1$, the duty cycle $\gamma$ of the chopper CH is controlled by a current control system not shown in the drawing, while maintaining the motor current $I_M$ constant. At this time, the field current $I_F$ is at its minimum as shown in (a) of FIG. 7. In other words, the magnetic field is in the weakest state. The regenerative current $I_S$ and the motor voltage $E_M$, on the other hand, are reduced with the deceleration as will be seen from (b) and (c) of FIG. 7. With the decrease in the motor voltage $E_M$, the duty cycle $\gamma$ is increased, so that the equilibrium of the voltage shown in equation (2) is maintained.

The fact that even if the velocity $V_1$ is reached and the motor voltage $E_M$ reduced to open the field switch $FS_1$ for an intensified field, the relation of $E_M < E_s + RI_M$ is maintained, that is, the difference is more than the first set value, is detected by the voltage comparator FC. The voltage comparator FC produces an open signal, so that the operating relay $RY_1$ is energized thereby to open the field switch $FS_1$, with the result that the field current $I_F$ is increased by one step as shown by (a) of FIG. 7, while at the same time the motor voltage $E_M$ rises as shown in (c) of FIG. 7. At this time, the motor current $I_M$ also tends to be increased. Therefore, the duty cycle $\gamma$ is lessened by a current control system not shown in the drawing in such a manner that the chopper voltage $E_{CH}$ is increased with the increase of the motor voltage $E_M$, thereby maintaining the motor current $I_M$ constant. On the other hand, the regenerative current $I_S$ is increased as shown by (b) of FIG. 7, so that the regenerative power $P_S$ is also increased.

When the velocity is decreased to $V_2$, the voltage comparator FC produces an open signal again. As a result, the logical element $AND_2$ produces a signal due to the energized state of the relay $RY_1$, thereby energizing the relay $RY_2$. The field switch $FS_2$ is thus opened. By progressively strengthening the field subsequently in a similar way, the braking force is increased in steps at the velocities $V_1$, $V_2$ and $V_3$ as shown in (d) of FIG. 7.

At velocity levels below $V_3$, the chopper voltage $E_{CH}$ is compared with the source voltage $E_S$ in the voltage comparator RC. The switches $RS_1$, $RS_2$ and $RS_n$ are sequentially closed, while ascertaining the fact that the equation (2) concerning the equilibrium of voltages is maintained by the controlling of the duty cycle of the chopper CH even if one step of the resistor R is short-circuited, namely, ascertaining the establishment of the relation $$(E_S - E_{CH}) > \Delta R I_M \qquad 8.$$

where $\Delta R$ is the resistor section or step short-circuited.

Figure 7:
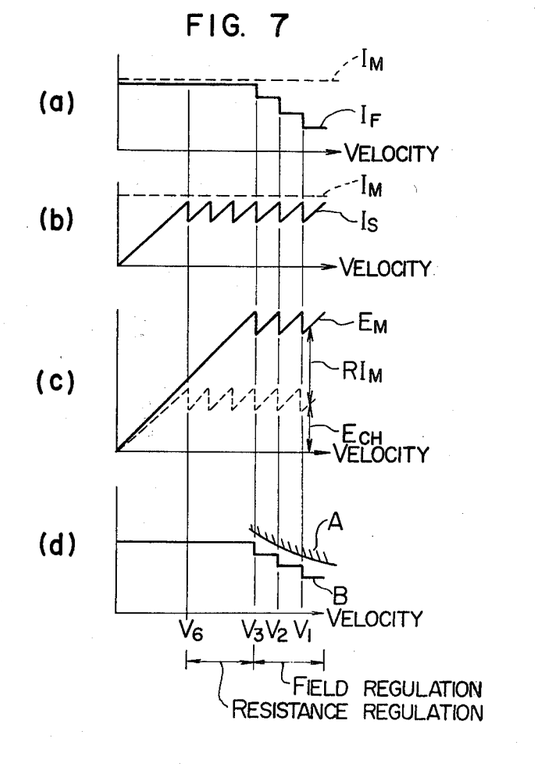
FIG. 7 is a diagram showing the operating characteristics of the control apparatus of FIG. 4.

As explained above, the braking force characteristic as shown in (d) of FIG. 7 is obtained by the combined use of the field control and the resistance regulation. In other words, the braking force can be regulated commensurately with the limit of adhesion without reducing the motor current $I_M$ and hence the regenerative current $I_S$, namely, the regenerative power $P_S$. Even though the characteristics diagram of FIG. 7 refers to the case in which the motor current $I_M$ is controlled constant, the motor current $I_M$ may be appropriately increased or decreased as against the velocity depending on the required braking force characteristic to attain a more suitable braking force characteristic.

The embodiment shown in FIG. 6 is such that in effecting braking at a high velocity, the field control is first effected and then the resistance is regulated. The velocity at which the resistor is completely short-circuited, namely, the velocity $V_6$ shown in FIG. 7 is included in the range of a constant braking force. This type of control is suitably applied to the braking of the electric car running at a comparatively low velocity as shown in (b) of FIG. 3.

Figure 8:
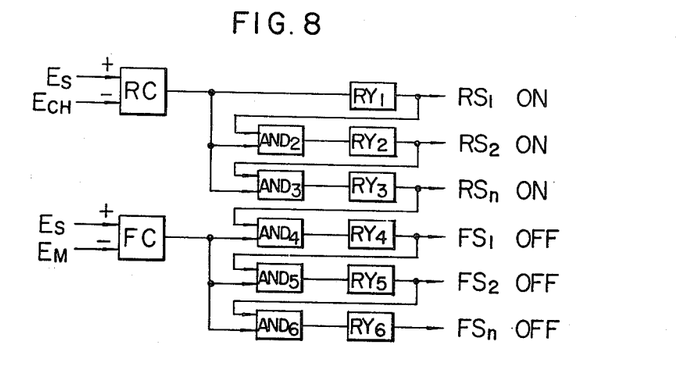
FIG. 8 is a block diagram showing another embodiment of the control apparatus of FIG. 4.
Figure 9:
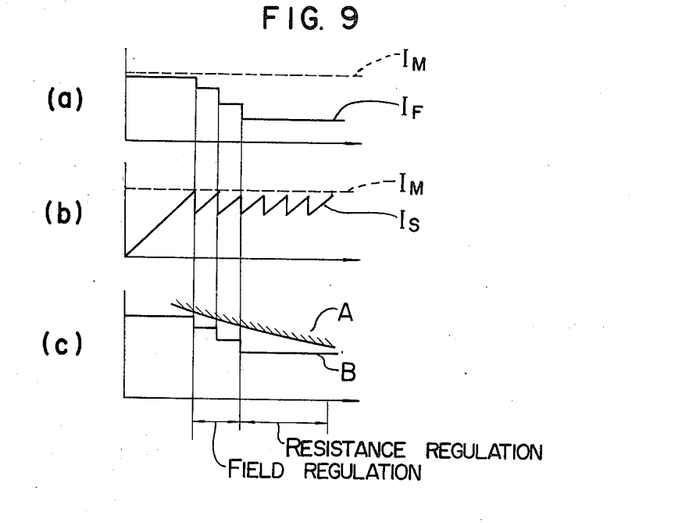
FIG. 9 is a diagram showing the operating characteristics of the control apparatus of FIG. 8.

The diagram of FIG. 8 shows a control apparatus according to an embodiment of the invention suitable for braking of a comparatively high-velocity electric car involving a wide velocity range influenced by the limit of adhesion. In the drawing, all the reference symbols denote like component elements in FIG. 6. The voltage comparator RC used for short-circuiting of the resistor in the apparatus of FIG. 8 detects that the chopper voltage $E_{CH}$ is reduced to a certain value below the line voltage $E_S$, that is, the difference therebetween exceeding a second set value, sequentially closing the switches $RS_1$ to $RS_n$. After that, it is detected that the motor voltage $E_M$ is reduced by more than the first set value as against the line voltage $E_S$, with the result that the switches $FS_1$ to $FS_n$ are sequentially opened to strengthen the magnetic field. By so doing, the braking characteristics based on the control of the motor current $I_M$ at a fixed level are as shown in FIG. 9. In other words, since the braking force B begins to be reduced at a comparatively low velocity point as shown in (c) of FIG. 9, the braking force characteristic suitable to the electric car high in maximum velocity as shown in (c) of FIG. 3 is obtained.

Figure 10:
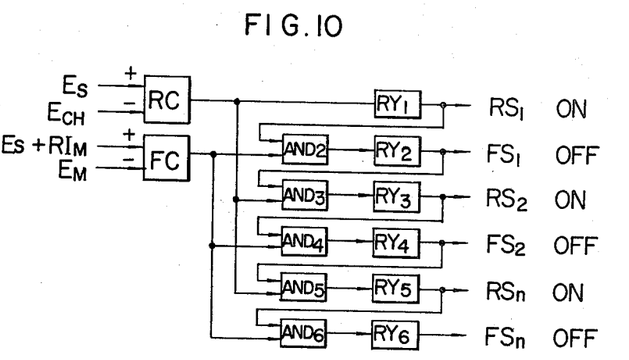
FIG. 10 is a block diagram showing still another embodiment of the control apparatus of FIG. 4.
Figure 11:
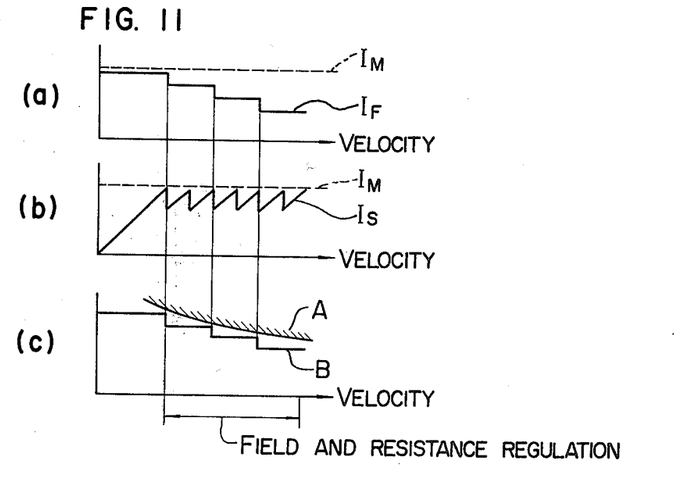
FIG. 11 is a diagram showing the operating characteristics of the embodiment of FIG. 10.

Still another embodiment of the invention is shown in FIG. 10, wherein the field regulation and resistance regulation are performed alternately. The reference symbols in FIG. 10 denote the same component elements as those in FIG. 4, and the apparatus of FIG. 10 is characterized in that the switches $RS_1$ to $RS_n$ alternate with the switches $FS_1$ to $FS_n$ in operation. The braking force characteristics of the embodiment under consideration are shown in FIG. 11, and it will be seen that the braking force B declines more gently than in FIG. 7 or FIG. 9, thereby making it possible to accomplish the control of the braking force in harmony with the limit of adhesion.

The type of the control system to be selected from among all the embodiments mentioned above depends on the required braking force characteristics of the electric car involved.

Further, the resistance and the field may be regulated continuously instead of in steps as in the preceding embodiments.

Figure 12:
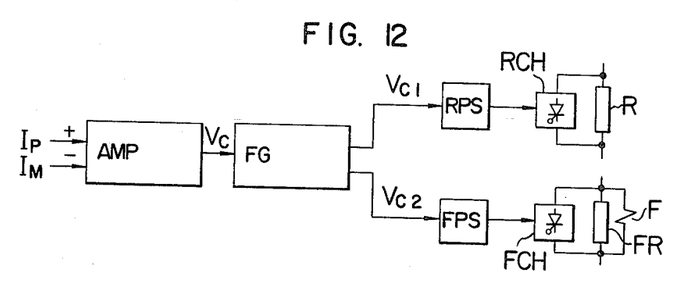
FIG. 12 shows another embodiment of the field regulating means and the resistance regulating means according to the present invention.

An embodiment utilizing the continuous regulation is shown in FIG. 12. In this drawing, reference symbol RCH shows a chopper for continuous regulation of an equivalent resistance value of the resistor R, symbol FCH a chopper for continuously regulating the field current by continuous regulation of the resistor FR, symbols RPS and FPS phase shifters for controlling the duty cycle of the choppers RCH and FCH respectively, symbol FG a function generator for providing the regulating sequence of the choppers RCH and FCH, and symbol AMP an amplifier for comparing the command value of the motor current with the actual motor current $I_M$ and amplifying the resulting difference $V_C$ therebetween.

Figure 13A:
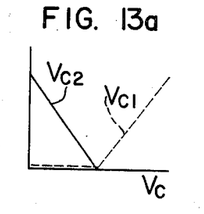
FIGS. 13a to 13c are diagrams showing the input and output characteristics of the function generator in the embodiment of FIG. 12.
Figure 13B:
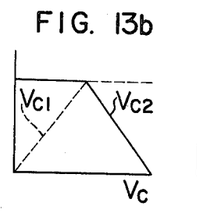
Figure 13C:
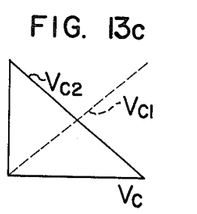

The graphs of FIGS. 13a, 13b and 13c illustrate three typical input and output characteristics of the function generator FG. When the characteristic of FIG. 13a is involved, the voltage $V_{C2}$ is first regulated and the duty cycle of the field regulating chopper FCH is enlarged thereby to weaken the magnetic field F. When with the decrease in velocity the duty cycle is reduced and the magnetic field is strengthened so that the current difference $V_C$ is increased, the voltage $V_{Cl}$ is regulated thereby to increase the duty cycle of the resistance-regulating chopper RCH, that is to say, the equivalent resistance value of the resistor R is reduced. As a result, the transfer is made from the magnetic field regulation to the resistance regulation as in the embodiment of FIG. 6.

In like manner, in the event that the function generator FG has the characteristic as shown in FIG. 13b, the regulation similar to that in the embodiment of FIG. 8 is performed, and the characteristic of FIG. 13c makes possible the alternate regulation between the resistance and magnetic field as in the case of FIG. 10.

In this continuous regulation, it is not necessarilly required to control the chopper CH but the duty cycle thereof may be fixed at a minimum level in the range of regulation of resistance or field. As a result, the regenerative current does not take the form of a saw-tooth wave as shown in FIG. 7, 9 or 11, so that the motor current $I_M$ is substantially uniform. Thus the regenerative power $P_S$ is further increased.

It will be seen that according to the present invention, the braking force is reduced without reducing the regenerative current and hence the regenerative power in the high velocity range where the braking force is limited, thereby making it possible to improve the regenerative efficiency. Also, a smaller amount of energy is consumed in the resistor connected in series with the DC motor, thus reducing the capacity of the resistor. Further, the field regulating device which is generally used in the powering regulation of the electric car to attain the high velocity performance may be employed as the field regulation means in the present invention with the only addition of switches for resistance short-circuiting.

Figure 14:
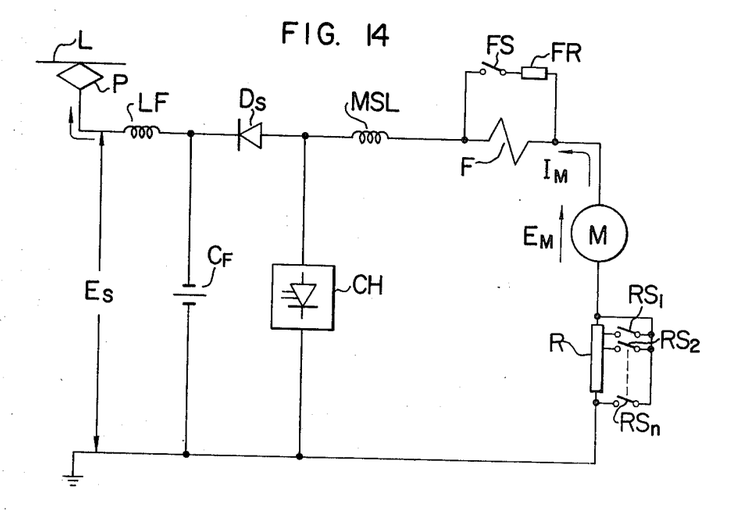
FIG. 14 is a diagram showing the configuration of the main circuits of still another embodiment of the invention.

Unlike the embodiments shown in FIGS. 4 to 13 referring to the cases in which the magnetic field is controlled continuously or in steps from weak to strong levels, the embodiment of FIG. 14 comprises only one switch FS and a bypass resistor FR to fix the magnetic field at a weak level.

In this case, in starting the regenerative braking, the switch FS is closed to fix the magnetic field at a low level and then the resistor R is short-circuited sequentially with the switches $RS_1$ to $RS_n$ for the purpose of braking operation.

Figure 15:
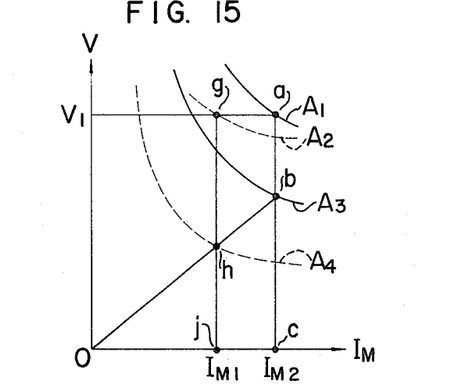
FIG. 15 is a diagram showing the operating characteristics of the embodiment of FIG. 14.

The operating characteristics of the embodiment under consideration will be explained below with reference to FIG. 15 showing the relation between the motor current $I_M$ and the velocity $V_1$.

The curve $A_1$ shows the case in which the switch FS is closed to attain a weak magnetic field and the switches $RS_1$ to $RS_n$ are all opened to utilize the whole of the resistor R; the curve $A_2$ the case in which the switch FS is opened to attain the full magnetic field and the switches $RS_1$ to $RS_n$ are all opened to utilize the whole resistance of the resistor R; the curve $A_3$ the case in which the switch FS is closed to attain the weak magnetic field and the switch $RS_n$ is closed to shortcircuit the resistor R; and the curve $A_4$ the case in which the switch FS is opened for full magnetic field and switch $RS_n$ is closed to short-circuit the resistor R.

In other words, the characteristic curve $A_4$ concerns the regenerative braking only by the on-off control of the chopper CH; the characteristic curve $A_3$ the weak magnetic field regulation in addition to the on-off control by the chopper CH; the characteristic curve $A_2$ the resistance regulation in addition to the on-off control by the chopper CH, corresponding to the construction of FIG. 1; and the characteristic curve $A_1$ both the weak magnetic field and resistance regulation added to the on-off control by the chopper CH as related to the present invention.

In effecting the regenerative braking at the velocity $V_1$, it will be seen from the diagram of FIG. 15 that the motor current $I_{M2}$ larger than $I_{M1}$ is required if the braking force which would be obtained with the motor current $I_{M1}$ for the full magnetic field is to be obtained at the weak magnetic field. In the event that the resistor R is capable of being changed continuously, the regenerative braking is effected at the velocity $V_1$ and downward in such a manner that the motor current $I_M$ undergoes changes along the line g-h-j and the regenerative current $I_S$ along the line g-h-o in the case of full magnetic field.

In the case of weak magnetic field, on the other hand, the motor current $I_M$ varies along the line a-b-c, and the regenerative current $I_S$ along the line a-b-h-o.

As a result, the regenerative current $I_S$ is larger b the area defined by g-a-b-h and regenerative power larger accordingly in the case of the weak magnetic field than in the case of the full magnetic field.

The above-mentioned fact that the regenerative braking of the DC motor using the magnetic field and resistance regulation according to the present invention results in a larger regenerative electric power will be explained below by reference to formulae.

Let the field weakening factor be W, and the motor voltage $E_M$ is expressed by $$E_M = \Phi(WI_M) V \qquad 9.$$

where $\Phi$ is magnetic fluxes and $\Phi(WI_M)$ expresses magnetic flux $\Phi$ as a function of the field factor W and motor current $I_M$.

Thus, the velocity V is given as $$V = \frac{E_s(1-\gamma) + (R_R + R_0)I_M}{\Phi(WI_M)} \qquad 10.$$

where $R_0$ is the internal resistance of the motor circuit.
The braking force BE is $$BE = \Phi(WI_M) I_M \qquad 11.$$

As will be apparent from the equation (11), the same force is obtained by weakening the field, namely, lessening the field factor W as when the magnetic field is maintained at the full level while at the same time enlarging the motor current $I_M$.

By way of explanation, assume that the magnetic fluxes $\Phi$ are proportional to the field current $I_F$, and $$\Phi = WI_M \qquad 12.$$

By substituting the equation (12) into the equation (11), $$BE = WI_M^2 \qquad 12'.$$

Also assume that $BE_1$ is the braking force when the motor current $I_{M1}$ is involved at the full field, and $I_{M2}$ the motor current whereby the same braking force as $BE_1$ is capable of being obtained at the field factor W. Then $$BE_1 = WI_{M2}^2 = I_{M1}^2 \qquad 13.$$

From the equation (13)

$$I_{M2} = \frac{I_{M1}}{\sqrt{W}} \qquad 14.$$

The magnetic fluxes against the field factor W are obtained from the equations (12) and (14), as follows:

$$\Phi_2 = WI_{M2} = \sqrt{W} I_{M1} \qquad 15.$$

From the equation (15) above, it will be obvious that the magnetic fluxes $\Phi_2$ against the field factor of W is $\sqrt{W}$ times the magnetic fluxes $\Phi_1$ against the full field. The field factor W is smaller than 1 and the magnetic fluxes $\Phi_2$ for obtaining the same braking force at the weak field as at the full field are smaller than the magnetic fluxes $\Phi_1$.

Accordingly, the denominator in the equation (10) is smaller than when the full magnetic field is involved, resulting in a higher velocity V. In other words, the regenerative braking is possible at a higher velocity when the weak magnetic field is involved than when the resistor R is inserted. This means that more electric power generated by the motor can be turned back to the car line L, leading to an improved regenerating efficiency. Also, as compared with the case of mere insertion of the resistor R, the capacity of the resistor R can be reduced to effect the regenerative braking at the same velocity.

Furthermore, the embodiment of FIG. 14 is such that the field regulation is performed by the operation of the switch FS to attain a fixed weak field, thus facilitating the switching operation.

It will also be easily seen that in place of the resistor inserted in parallel to the field winding to attain the weak field, the field may be provided with an intermediate tap or divided in order to attain the weak field without use of any part of the full field winding.

In addition, unlike the above-described embodiments in which the resistance value of the resistor R is regulated in steps by the use of the switches $RS_1$ to $RS_n$ or continuously by the use of the chopper RCH, the embodiment described below is more economical in that the resistance value is regulated by the chopper CH without resorting to the switches $RS_1$ to $RS_n$ or chopper RCH.

As the chopper to attain such a purpose, the one shown in FIG. 5b or 5c suffices. This is because, in the chopper in FIG. 5b or 5c, the thyristors may be managed to be used as a main thyristor and an auxiliary thyristor respectively in circuit connection.

Figure 16:
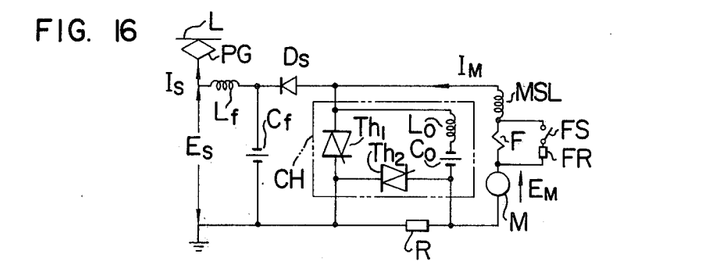
FIG. 16 is a diagram showing the configuration of the main circuits of a further embodiment of the invention.

The diagram of FIG. 16 shows an embodiment of the invention including a chopper using reverse-conducting thyristors. In the drawing under consideration, the main reverse-conducting thyristor $Th_1$ is connected in parallel to a series circuit including a DC motor (having the armature M and the field winding F), a smoothing reactor MSL and a resistor R. The auxiliary reverse-conducting thyristor $Th_2$ is connected in parallel to the resistor R, and an end of the series circuit including the commutating reactor $L_0$ and the commutating capacitor $C_0$ is connected to a junction point between the main reverse-conducting thyristor $Th_1$ and the smoothing reactor MSL, the other end thereof being connected to a junction point between the armature M and the resistor R, namely, a junction point between the resistor R and the auxiliary reverse conducting thyristor $Th_2$. By the way, the reverse-conducting thyristors $Th_1$ and $Th_2$ will be hereinafter referred to only as the thyristors.

Figure 17:
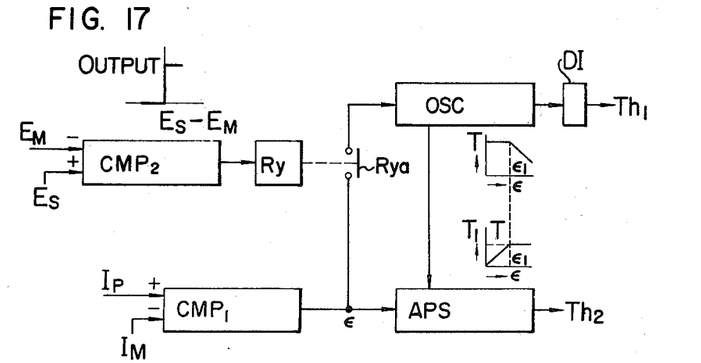
FIG. 17 is a block diagram showing the control apparatus according to the embodiment of FIG. 16.

A block diagram of the current control device for regulating the motor current $I_M$ by the controlling of the firing of the thyristors $Th_1$ and $Th_2$ is shown in FIG. 17.

In this drawing, a comparator $CMP_1$ compares the current command value $I_P$ with the actual motor current $I_M$ and the resulting deviation $\epsilon$ or difference, if any, is applied to the phase shifter APS, which in turn regulates the current flow width or energization period of the thyristor $Th_2$ in accordance with the deviation $\epsilon$. Specifically, the larger the current flow width of the thyristor $Th_2$, the larger the deviation $\epsilon$. Reference symbol $CMP_2$ shows a comparator for comparing the line voltage $E_S$ with the motor voltage $E_M$ and produces an output when the line voltage $E_S$ is higher than the motor voltage $E_M$, symbol Ry a relay energized in response to the output from the comparator $CMP_2$, and symbol Rya a normally-open contact thereof. Symbol OSC shows an oscillator for determining the power frequency of the phase shifter APS, namely, the operating frequency of the chopper. The oscillation period T of the oscillator OSC is constant when $E_M$ is higher than $E_S$, whereas it is variably controlled when $E_S$ is higher than $E_M$. In other words, when $E_S$ is higher than $E_M$, an output is produced from the comparator $CMP_2$ thereby to energize the relay Ry. Upon the energization of the relay Ry, the normally-open contact Rya is closed and the deviation $\epsilon$ is applied to the oscillator OSC, the oscillation period of which is controlled in accordance with the deviation $\epsilon$. More specifically, the larger the deviation $\epsilon$, the smaller the oscillation period T. Reference symbol DI shows a differentiation circuit for differentiating the output of the oscillator OSC and applies its differentiated output to the thyristor $Th_1$ as a gate signal.

Figure 18:
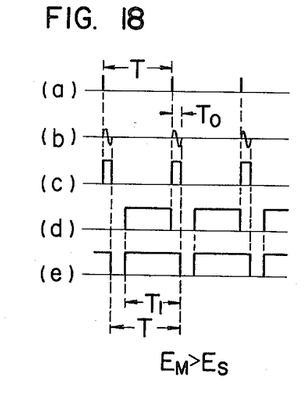
FIGS. 18 and 19 are diagrams for explaining the operation of the control apparatus of FIG. 17.
Figure 19:
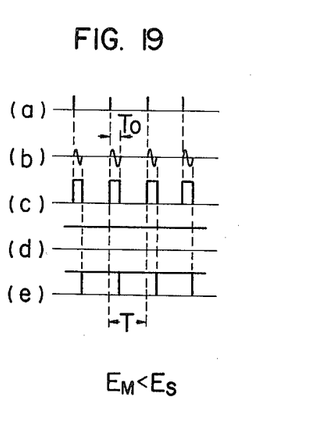

Next, the operation of the device under consideration will be explained with reference to FIGS. 18 and 19 showing the operating waveforms of the cases in which $E_M$ is higher than $E_S$ and $E_S$ is higher than $E_M$ respectively.

First, at a motor speed higher than the rated velocity where the motor voltage $E_M$ is higher than the line voltage $E_S$, the normally-open contact Rya of the relay Ry is open, and the oscillation period T of the oscillator OSC is constant. In this case, the gate signal for the thyristor $Th_1$ is given for a fixed oscillation period of T from the oscillator OSC as shown in (a) of FIG. 18. The thyristor $Th_1$ is thus energized for the period $T_0$ determined by the oscillation period $L_0$-$C_0$ as shown in (b) of FIG. 18.

The gate signal for the thyristor $Th_2$, on the other hand, is given from the phase shifter APS for the energization period corresponding to the deviation $\epsilon$ of the motor current $I_M$ from the current command value $I_P$ as shown in (d) of FIG. 18. The thyristor $Th_2$ is energized during the period $T_1$ including the additional period $T_0$ as shown in (e) of FIG. 18.

The energization period $T_1$ of the thyristor $Th_2$ is increased according as the motor voltage $E_M$ is decreased. When the motor voltage $E_M$ becomes equal to the line voltage $E_S$, the energization period $T_1$ of the thyristor $Th_2$ becomes T, so that the resistance value of the resistor R is reduced to zero.

Next, when the motor voltage $E_M$ is decreased below the line voltage $E_S$, namely, when the motor velocity is reduced below the rated velocity, the normally-open contact Rya of the relay Ry is closed. The oscillator OSC is impressed with the deviation or difference $\epsilon$ between the current command value $I_P$ and the motor current $I_M$ and the oscillation period T thereof is controlled in accordance with the difference $\epsilon$. The thyristor $Th_1$ is energized during the period $T_0$ determined by the oscillation period as shwon in (c) of FIG. 19. On the other hand, a continuous gate signal shown in (d) of FIG. 19 is applied to the thyristor $Th_2$, so that the energization period or width $T_1$ of the thyristor $Th_2$ is equal to T thereby to reduce the value of the resistor R to zero. Actually, however, the second thyristor $Th_2$ is de-energized during one-fourth of the oscillation period $T_0$ which is approximately 30 to 50 $\mu$s and negligibly small as compared with the period T, posing no practical problem. As mentioned above, as long as $E_S$ is higher than $E_M$, the energization period or duty cycle of the chopper CH is controlled by the oscillation period T and is larger according as the motor velocity is reduced.

In the above-described regenerative braking operation, one set of choppers is used, thus making possible a low-cost control apparatus.

The embodiment of FIG. 16 requires that the thyristor $Th_2$ be always energized at velocities below the rated velocity, so that the duty cycle or the period T of the thyristor $Th_1$, namely, the operating frequency of the chopper CH is controlled. In this case, the problem of inductive disturbance may occur depending on the operating frequency.

Figure 20:
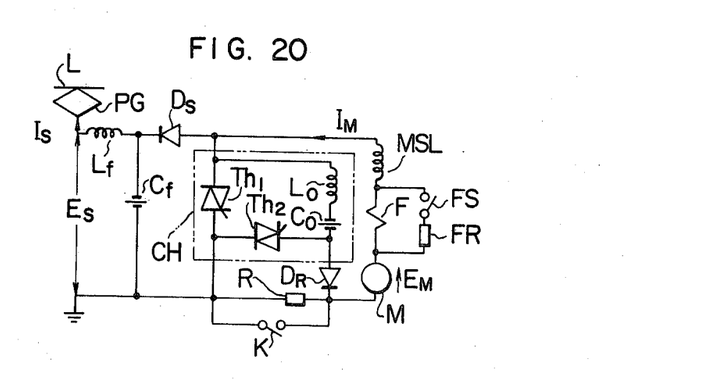
FIG. 20 is a diagram showing the construction of the main circuits of a modification of the embodiment of FIG. 16.

Another embodiment of the invention taking the problem of inductive disturbance into consideration is shown in FIG. 20.

The embodiment shown in this drawing differs from that of FIG. 16 in that in the embodiment under consideration the resistor R is connected in parallel to the switch K and at the same time a junction point between thyristor $Th_2$ and a commutating device including the commutating reactor $L_0$ and the commutating capacitor $C_0$ is connected through a diode $D_R$ to the resistor R.

Figure 21:
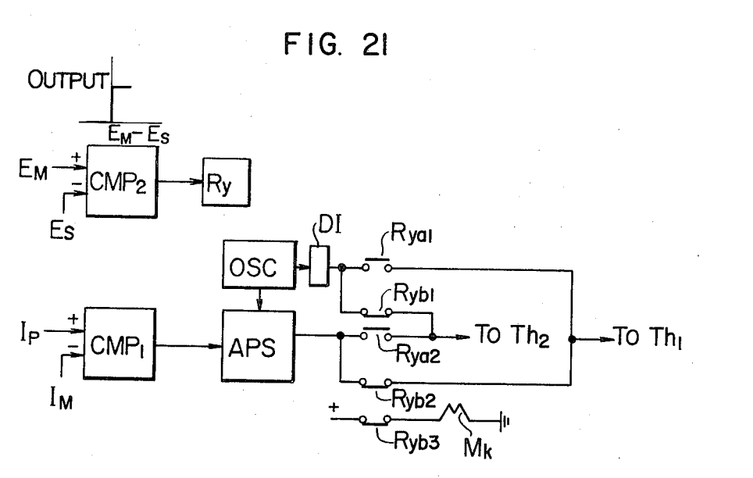
FIG. 21 is a block diagram showing the control apparatus of FIG. 20.

A block diagram of the current control apparatus of FIG. 20 is shown in FIG. 21.

In the drawing, like reference symbols denote like component elements in FIG. 17. Symbol Mk shows a driving coil for the switch K, and symbols $Rya_1$, $Ryb_1$ to $Ryb_3$ normally-open and normally-closed contacts of the relay Ry respectively.

It was already mentioned with reference to the embodiment of FIG. 16 that at velocities higher than the rated velocity, the energization period of the thyristor $Th_2$ must be controlled, whereas at velocities below the rated velocity, the energization period of the thyristor $Th_1$ is required to be controlled. For this purpose, the outputs of the phase shifter APS and the oscillator OSC are switched with each other to use as gate signals for the thyristors $Th_1$ and $Th_2$ according to the operating condition of the relay Ry.

Specifically, when $E_M$ is higher than $E_S$, the relay Ry is energized in response to the output of the comparator $CMP_2$ and closes its normally-open contacts Rya1 and Rya2. As a result, the output of the phase shifter APS is applied to the thyristor $Th_2$ as a gate signal therefor, while the differentiated output of the differentiating circuit DI for differentiating the oscillation output of the oscillator OSC is applied to the thyristor $Th_1$ as a gate signal.

In the event that the voltage $E_S$ is higher than $E_M$, by contrast, the relay Ry is so de-energized as to close the normally-closed contacts Ryb1 to Ryb3. The output of the phase shifter APS is applied to the first thyristor $Th_1$ as a gate signal therefor, and the differentiated output of the differentiating circuit DI is applied as a gate signal to the second thyristor $Th_2$. Also, the closing of the normally-closed contact Ryb3 causes the driving coil MK to be excited.

Next, the operation of the circuit shown in FIG. 21 will be explained below with reference to FIGS. 22 and 23.

Figure 22:
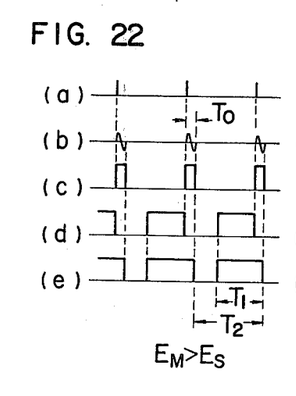
FIGS. 22 and 23 are diagrams for explaining the operation of the control apparatus of FIG. 21.
Figure 23:
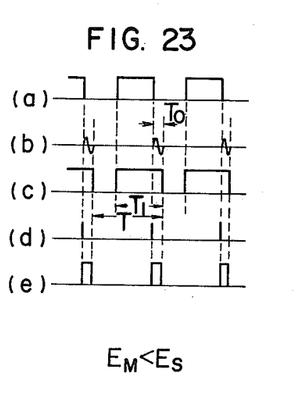

The graph of FIG. 22 shows the operating waveforms in the case where $E_M$ is higher than $E_S$, and that of FIG. 23 the operating waveforms in the case where $E_S$ is higher than $E_M$.

First, at velocities higher than the rated velocity where the motor voltage $E_M$ is higher than the line voltage $E_S$, the normally-open contacts Rya1 and Rya2 are closed, whereupon a gate signal with a fixed oscillation period T is applied to the thyristor $Th_1$ as shown in (a) of FIG. 22, thus energizing the thyristor $Th_1$ for the period $T_0$ determined by the oscillation period $L_0$-$C_0$ as shown in (c) of FIG. 22. The thyristor $Th_2$, on the other hand, is impressed with a gate signal from the phase shifter APS according to the difference $\epsilon$ between the current command value $I_P$ and the motor current $I_M$. As a result, the energization period of the thyristor $Th_2$ continues for $T_1$ as shown in (e) of FIG. 22 and is lengthened according as the motor voltage $E_M$ is reduced. When the motor voltage $E_M$ becomes equal to the line voltage $E_S$, the energization period $T_1$ of the thyristor $Th_2$ becomes equal to T, with the result that the resistance value of the resistor R is decreased to zero. As long as the voltage $E_M$ is higher than $E_S$, the thyristor $Th_2$ is used as a main thyristor and the thyristor $Th_1$ as a commutating thyristor.

In the event that the motor voltage $E_M$ is lower than the line voltage $E_S$, on the other hand, the normally-closed contacts Ryb1 to Ryb3 of the relay Ry are closed, which in turn causes the driving coil $M_K$ of the switch K to be excited, thus short-circuiting the resistor R through the switch K. At the same time, the fact that the contacts Ryb1 and Ryb2 are closed causes a gate signal with a fixed oscillation period T as shown in (d) of FIG. 23 to be applied to the thyristor $Th_2$ from the oscillator OSC. The thyristor $Th_1$ is also impressed with a gate signal in the form of an output from the phase shifter APS. In this way, with the decrease of the motor voltage $E_M$, the energization period $T_1$ of the thyristor $Th_1$ is controlled in the manner as shown in (c) of FIG. 23, the second thyristor $Th_2$ being energized for the period $T_0$ determined by the oscillation period as shown in (e) of FIG. 23. In this case, the thyristors $Th_1$ and $Th_2$ are used as the main and commutating thyristors respectively.

Incidentally, the diode $D_R$ is provided for the purpose of preventing the discharge of the commutating capacitor $C_0$ which otherwise might occur in the closed loop including $C_0$, $L_0$, $Th_1$, K and $C_0$ at the time of energization of the thyristor $Th_1$.

As mentioned above, the embodiment of FIG. 20 is provided with the switch K and the diode $D_R$ and characterized in that the thyristors $Th_1$ and $Th_2$ are used differently as the main and commutating thyristors at the levels below and above the rated velocity, thereby making possible a fixed operating frequency of the chopper. This contributes to the solution of the problem of inductive disturbance.

By the way, the motor is operating as a DC generator at the time of regenerative braking. In the beginning of regenerative braking operation, however, the motor voltage $E_M$ is about several tens of volts even though the motor is above the rated velocity. Therefore, even in the case where the regenerative braking is begun at a velocity higher than the rated velocity, the circuit of FIG. 20 must assume the circuit condition suitable for the velocities below the rated velocity, that is to say, the switch K must be closed. And it is when the motor voltage $E_M$ is established and increased beyond the line voltage $E_S$ by the chopper regulation that the switch K is required to be closed. The time required for the motor voltage $E_M$ to be established is approximately several hundred milliseconds for the motor of 100 KW class for the driving of the electric car. By way of comparison, it takes from several tens of seconds to several hundred seconds before the switch K is energized.

Therefore, the problem accompanying the regenerative braking effected at higher than the rated velocity is the difficulty in achieving the appropriate timing with which the switch K is to be opened.

Figure 24:
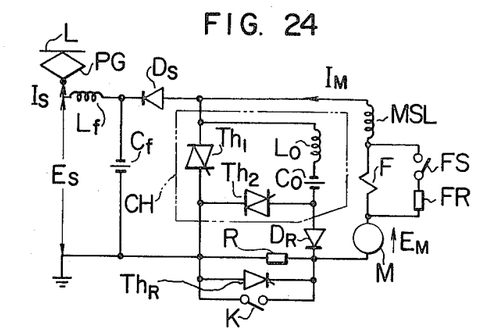
FIGS. 24, 25a and 25b are diagrams showing a modification of the embodiment of FIG. 14.
Figure 25A:
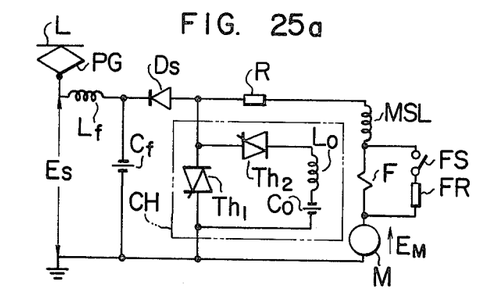
Figure 25B:
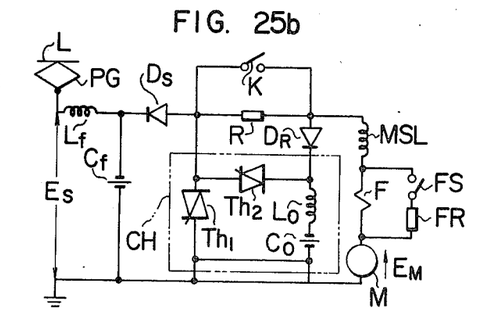

The embodiment of the present invention shown in FIG. 24 offers a solution to such a problem.

The embodiment of FIG. 24 is different from that of FIG. 20 in that an auxiliary thyristor $Th_R$ in addition to the switch K is connected in parallel to the resistor R.

In this construction, the switch K is opened and the auxiliary thyristor $Th_R$ energized thereby to short-circuit the resistor R in starting the regenerative braking at a velocity higher than the rated velocity. When the motor voltage $E_M$ is established and reaches beyond the line voltage $E_S$, the auxiliary thyristor $Th_R$ is turned off for insertion of the resistor R. The turning off of the auxiliary thyristor $Th_R$ is effected simultaneously with the turning off of the thyristor $Th_2$. In other words, the thyristor $Th_2$ is turned off by the reverse current of the oscillation current caused by the energization of the thyristor $Th_1$ as shown in FIG. 22. Such a reverse current flows also in the loop $C_0$ to $D_R$ to $Th_R$ to $Th_1$ to $L_0$ to $C_0$.

In this way, the auxiliary thyristor $Th_R$ is turned off. Since this de-energization never fails to occur during the energization period of the chopper, it is necessary to always apply a gate signal to the auxiliary thyristor $Th_R$. Subsequently when the motor is decreased in velocity below the rated value, the switch K is closed and the resistor R short-circuited. In the event that quick response of the switch K in its closing operation is required, the auxiliary thyristor $Th_R$ may first be turned on and then the switch K closed.

The auxiliary thyristor $Th_R$ may be small in capacity for the reason that the energization period thereof may only be as long as the time required for the rise of the motor voltage.

The resistor R may be inserted in the positive side of the power supply with equal effect instead of in the negative side of the series circuit including the DC motor and the smoothing reactor MSL as in the above-described embodiments.

What is claimed is:

1. In an electric braking control apparatus for the DC motor comprising a DC power supply; a series circuit including a smoothing reactor connected in series with said DC power supply, a DC motor with the armature and field winding thereof connected in series with each other, and a resistor; a chopper connected in parallel to said series circuit; and a diode inserted between said DC power supply and said parallel circuit including said series circuit and said chopper; said chopper being turned on and off for effecting the regenerative braking: the improvement further comprising field regulating means for regulating the field of said field winding and resistance regulating means for regulating the resistance value of said resistor, the regenerative braking being effected by combined use of said field regulating means and said resistance regulating means.

2. An electric braking control apparatus for the DC motor according to claim 1, wherein said field regulating means is regulated in such a manner as to shift from a weak to intense field with the decrease in motor velocity, and said resistance regulating means is regulated in such a manner as to shift from a high resistance value to a low resistance value with the decrease in motor velocity.

3. An electric braking contol apparatus for the DC motor according to claim 2, wherein a transfer is made from said field regulating means to said resistance regulating means when a predetermined motor velocity is reached.

4. An electric braking control apparatus for the DC motor according to claim 3, wherein said field regulating means has a first chopper capable of continuously regulating the field, the duty cycle of said first chopper being reduced with the decrease in motor velocity, and said resistance regulating means has a second chopper capable of continuously regulating the resistance value of said resistor, the duty cycle of said second chopper being increased with the decrease in motor velocity.

5. An elecyric braking control apparatus for the DC motor according to claim 3, wherein said field regulating means include first means adapted for regulating the field in steps, said first means being actuated when the difference between the motor voltage $E_M$ and the sum of the voltage value $E_S$ of said DC power supply and the voltage drop $RI_M$ across said resistor reaches a predetermined value, said resistance regulating means include second means adapted for regulating the resistance value of said resistor in steps, said second means being actuated when the difference between said voltage value $E_S$ of said DC power supply and the average voltage $E_{CH}$ across said chopper reaches a predetermined value.

6. An electric braking control apparatus for the DC motor according to claim 2, wherein a transfer is made from said resistance regulating means to said field regulating means when a predetermined motor velocity is reached.

7. An electric braking control apparatus for the DC motor according to claim 6, wherein said resistance regulating means include a first chopper adapted for continuously regulating the resistance value of said resistor, the duty cycle of said first chopper being increased with the decrease in motor velocity, and said field regulating means include a second chopper adapted for continuously regulating the field, the duty cycle of said second chopper being reduced with the decrease in motor velocity.

8. An electric braking control apparatus for the DC motor according to claim 6, wherein said resistance regulating means include a first means adapted for regulating the resistance value of said resistor in steps, said first means being actuated when the difference between the voltage value $E_S$ of said DC power supply and the average voltage $E_{CH}$ across said chopper reaches a predetermined value, and said field regulating means include a second means adapted for regulating the field in steps, said second means being actuated when the difference between the voltage value $E_S$ of said DC power supply and the motor voltage $E_M$ reaches a predetermined value.

9. An electric braking control apparatus for the DC motor according to claim 2, wherein said field regulating means and said resistance regulating means are operated alternately.

10. An electric braking control apparatus for the DC motor according to claim 9, wherein said field regulating means include a first chopper with the duty cycle thereof continuously decreased with the decrease in motor velocity, and said resistance regulating means include a second chopper with the duty cycle thereof continuously increased with the decrease in motor veloci velocity.

11. An electric braking control apparatus for the DC motor according to claim 3, wherein said field regulating means include a first means adapted for regulating the field in steps, said first means being actuated when the difference between the motor voltage $E_M$ and the sum of the voltage value $E_S$ of said DC power supply and the voltage drop $RI_M$ across said resistor reaches a predetermined value, and said resistance regulating means include a second means adapted for regulating the resistance value in steps, said second means being actuated when the difference between the voltage value $E_S$ of said DC power supply and the average voltage $E_{CH}$ across said chopper reaches a predetermined value.

12. An electric braking control apparatus for the DC motor according to claim 1, wherein the field of said field winding is fixed at a low level by said field regulating means, and said resistance regulating means regulates said resistor in such a manner as to shift from a high to a low resistance value with the decrease in motor velocity.

13. An electric braking control apparatus for the DC motor according to claim 1, wherein said chopper includes a first thyristor for forming a closed circuit with said series circuit when said chopper is energized, a second thyristor for turning off said chopper by de-energizing said first thyristor, a commutating reactor and a commutating capacitor.

14. An electric braking control apparatus for the DC motor according to claim 13, wherein each of said first and second thyristors comprises a couple of diodes connected in parallel in opposite directions.

15. An electric braking control apparatus for the DC motor according to claim 14, wherein said second thyristor is connected in parallel to a resistor.

16. An electric braking contol apparatus for the DC motor according to claim 15, wherein a switch is connected in parallel to said resistor, and a diode is inserted in said parallel circuit including said resistor and said second thyristor.

* * * * *